United States Patent
Golovchinsky et al.

(10) Patent No.: US 9,542,492 B2
(45) Date of Patent: Jan. 10, 2017

(54) METHOD AND SYSTEM FOR GENERATING INTERACTIVE QUERY RESULTS PREVIEWS

(71) Applicant: FUJI XEROX CO., LTD., Minato-ku, Tokyo (JP)

(72) Inventors: Gene Golovchinsky, Menlo Park, CA (US); Anthony Dunnigan, Palo Alto, CA (US); Frank M. Shipman, III, College Station, TX (US); Elena Agapie, Cambridge, MA (US)

(73) Assignee: FUJI XEROX CO., LTD., Tokyo (JP)

( * ) Notice: Subject to any disclaimer, the term of this patent is extended or adjusted under 35 U.S.C. 154(b) by 194 days.

(21) Appl. No.: 13/762,019

(22) Filed: Feb. 7, 2013

(65) Prior Publication Data

US 2014/0222782 A1   Aug. 7, 2014

(51) Int. Cl.
*G06F 17/30* (2006.01)
(52) U.S. Cl.
CPC .............................. *G06F 17/30864* (2013.01)
(58) Field of Classification Search
CPC ............... G06F 17/30864; G06F 17/30867; G06F 17/30991; G06F 17/30973; G06F 17/30554
USPC ........................................................ 707/722
See application file for complete search history.

(56) References Cited

U.S. PATENT DOCUMENTS

| | | | |
|---|---|---|---|
| 7,546,291 B2 * | 6/2009 | Selca et al. | |
| 8,015,172 B1 * | 9/2011 | Cave | G06F 17/3087 707/706 |
| 8,577,911 B1 * | 11/2013 | Stepinski et al. | 707/765 |
| 8,645,360 B2 * | 2/2014 | Linsley et al. | 707/722 |
| 9,305,092 B1 * | 4/2016 | Finkelstein | G06F 17/3097 |
| 2005/0021245 A1 * | 1/2005 | Furuno et al. | 702/33 |
| 2010/0306229 A1 * | 12/2010 | Timm et al. | 707/767 |
| 2012/0078936 A1 * | 3/2012 | Kuo et al. | 707/766 |
| 2013/0138638 A1 * | 5/2013 | Karenos et al. | 707/728 |

OTHER PUBLICATIONS

Gene et al., "The future is in the past: Designing for exploratory search", FXPAL, Aug. 21, 2012, section 3.2.6.*
Gene et al., "Designing a tool for exploratory information seeking", FXPAL, May 5, 2012, p. 3.*
Gene et al., : "Querium: A Session-Based Collaborative Search System", FXPAL, Apr. 1, 2012, p. 2, Fig 1.*
Christopher Ahlberg and Ben Shneiderman, "Visual Information Seeking: Tight Coupling of Dynamic Query Filters with Starfield Displays," Institute for Systems Research, Sep. 1993.

(Continued)

*Primary Examiner* — Tony Mahmoudi
*Assistant Examiner* — Dongming Wang
(74) *Attorney, Agent, or Firm* — Sughrue Mion, PLLC

(57) ABSTRACT

A query results preview generation method and system that receives a preliminary query while a query for a search is being constructed, determines a distribution of result items that would be retrieved if the search were executed using the preliminary query, among a new result category including new result items and a previous result category including result items previously retrieved in a session, generates the query results preview using the distribution of result items that would be retrieved if the search were executed using the preliminary query, and provides the query results preview while the query for the search is being constructed and prior to execution of the search using the query.

22 Claims, 14 Drawing Sheets

(56) References Cited

OTHER PUBLICATIONS

"Information retrieval," Wikipedia, http://en.wikipedia.org/wiki/Information_retrieval, Feb. 6, 2013.
"Discounted cumulative gain," Wikipedia, http://en.wikipedia.org/wiki/Discounted_cumulative_gain, Feb. 6, 2013.
"About Google Instant," Google, http://www.google.com/insidesearch/features/instant/about.html, retrieved on Feb. 6, 2013.
Gene Golovchinsky, "What the Query Told the Link: The Integration of Hypertext and Information Retrieval," 1997.
Mark Sanderson and C.J. Van Rijsbergen, "NRT: news retrieval tool," Electronic Publishing, vol. 4(4), pp. 205-217, Dec. 1991.

\* cited by examiner

METHOD AND SYSTEM FOR GENERATING INTERACTIVE QUERY RESULTS PREVIEWS

BACKGROUND

Field

The present disclosure relates generally to exploratory search, and in particular to a query preview interface for exploratory search.

Description of the Related Art

Exploratory search involves running multiple queries and finding and examining many documents. Exploratory search is used in a variety of domains including academic research, intelligence analysis, e-discovery, and pharmaceutical research. Information seeking in these fields typically involves long sessions consisting of many queries, evolving information needs as searchers learn about the topic of interest and about the collection, and a focus on finding many pertinent documents rather than a single "best match." People often modify their search as their understanding of the topic evolves, but modifications may sometimes result in re-ranking previously retrieved documents rather than generating significant new material.

Exploratory search is a complex, cognitively demanding activity that places a heavy load on memory and of sense-making processes. Forcing people to use external tools that are poorly integrated, or by requiring them to rely on memory for significant periods of time may make a difficult task even harder. On the other hand, an overly complex interface may impose its own cognitive burden, distracting from the real task. Thus, a design challenge in building tools to support exploratory search involves finding a sweet spot in the design space: making tools that help more than they distract.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1A:
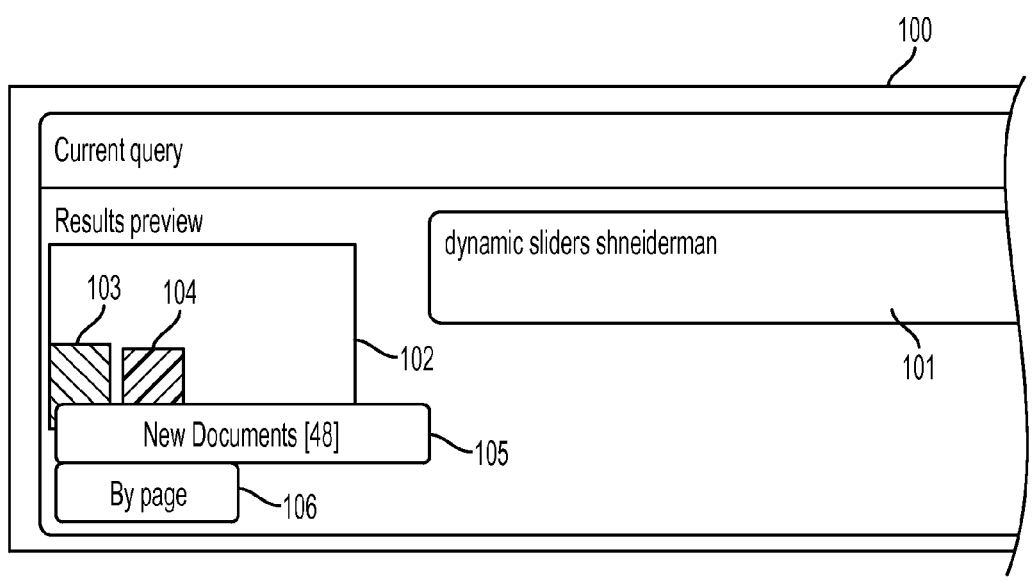
FIGS. 1A, 1B, 1C, and 1D illustrate query preview interfaces according to various embodiments.

FIG. 1A illustrates a query preview interface 100 according to an embodiment. A search box 101 is provided in which a user may type a query for a search. As the user is in the process of typing the query, a query results preview 102 is provided with respect to a preliminary query typed into the search box 101. The preliminary query is any text entered into the search box 101 prior to the user deciding to execute the search. Once the user executes the search, which may be requested by pressing an "enter" or "return" key on a keyboard or by clicking a button in the user interface, or by any other method, the text entered into the search box 101 becomes the query for the search. As a result of the user requesting execution of the search, search results corresponding to the query are presented to the user. The result items making up the search results may include documents, text, images, video, data, or any other information.

In exploratory search, the user may not immediately know the appropriate query based upon the user's information need. As the user enters text into the search box 101, a query results preview 102 is provided to the user with respect to the text in the search box 101. The query results preview 102 is updated as the user enters additional text or modifies the text in the search box 101. The query results preview 102 is a visualization of the distribution of result items that would be retrieved if the search were executed using the preliminary query over two or more categories.

According to an embodiment, the query results preview 102 may be a histogram that illustrates the distribution of result items that would be retrieved over categories including a new result category that includes new result items (i.e., result items that would be retrieved by the preliminary query but that have not been retrieved by any previous query in a session) and a previous result category that includes result items previously retrieved in the session.

According to another embodiment, the query results preview 102 may illustrate a relationship of result items that would be retrieved if the search were executed using the preliminary query with result items previously retrieved in a session.

A session may include one or more searches performed during a period. The beginning and/or end of a session may be specified by a user, or may be automatically determined based on factors including but not limited to time, search terms/keywords, users, user names, or any other factors. According to an embodiment, a session may be defined to include one or more searches related to a particular search topic or mission, and searches directed to a different topic would be performed in the context of a different session. The mission is a long-lasting (or intermittent) set of interactions with an information seeking system made up of multiple queries that retrieve multiple result items. For example, a first session may include searches related to a first research topic (e.g., genealogy), and a second session may include searches related to a second research topic (e.g., e-discovery).

According to an embodiment, a user may specify a change of sessions, such as from the second session back to the first session, or may specify the start of a new session, such as a third session. According to another embodiment, changing between sessions may be performed automatically based on factors including but not limited to time, search terms/keywords, users, user names, or any other factors.

The query results preview may assist the user in constructing a search query that will retrieve result items relevant to the user's information need, by providing a real-time preview of the result items that would be retrieved were the search executed using the preliminary query, with respect to the two or more categories such as the new result category and the previous result category. Aided by the information provided through the query results preview, the user may choose to use the preliminary query as the query and execute the search, or may choose to further refine the preliminary query prior to executing the search. The preliminary query may be refined by adding or removing terms and operators or selecting one or more result items to use as relevance feedback.

Once a search is executed, the result items retrieved by that search may be added to a set of previously retrieved result items stored in a memory, and when a user enters another preliminary query within the same session or search mission, result items that would be retrieved were the search executed using the preliminary query that also exist in the set of previously retrieved result items for that session are determined to be in the previous result category.

In the embodiment illustrated in FIG. 1A, the query results preview 102 includes a first bar 103 that shows a relative quantity of results in the new result category and a second bar 104 that shows a relative quantity of results in the previous result category. The first bar 103 has a first color or pattern, and the second bar 104 has a second color or pattern to distinguish it from the first bar 103. When a cursor is moved over the first bar 103, a label for the category corresponding to the first bar 103 ("new documents") and a number of documents in that category ("[48]") may be displayed, for example, in a tooltip 105. Likewise, when the cursor is moved over the second bar 104, a label for the category corresponding to the second bar 104 and a number of documents in that category may be displayed. Additionally, a button 106 may be provided that allows a user to determine whether the query results preview 102 is to be presented as a summary for the complete set of result items that would be retrieved were the search executed using the preliminary query, or whether the query results preview 102 is to be presented by bins in the ranked list of result items, such as pages of result items.

Figure 1B:
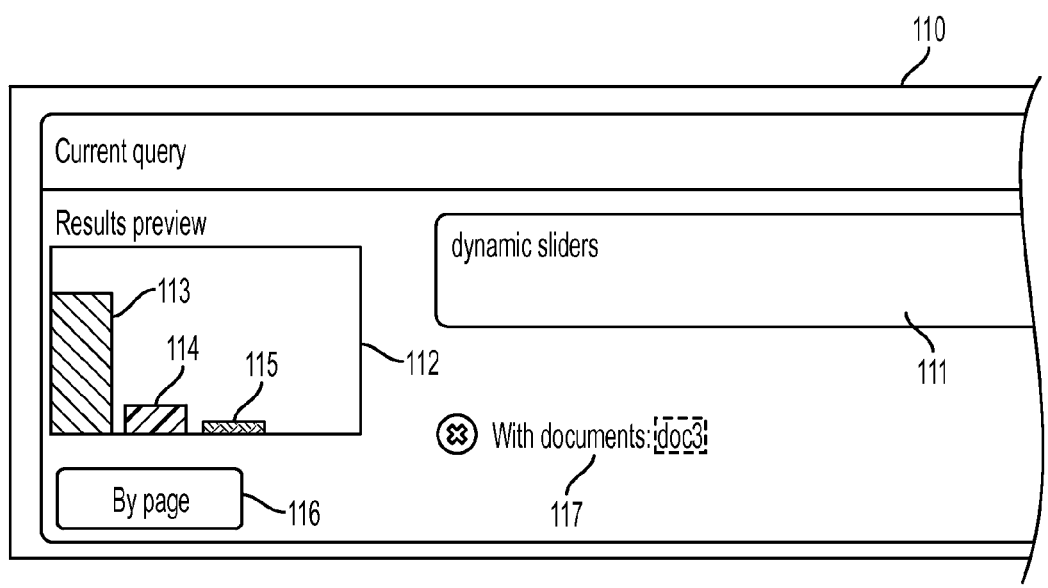

FIG. 1B illustrates a query preview interface 110 according to an embodiment. The query preview interface 110 includes a search box 111, a query results preview 112, a button 116 that allows for switching between alternate views of the query results preview 112, and an enumeration of any documents used as search criteria 117 (i.e., as relevance feedback).

The query results preview 112 is a visualization of the distribution of result items among a first category 113, a second category 114, and a third category 115. In an embodiment, the first category 113 is a new result category, the second category 114 is a non-presented previous result category that includes result items previously retrieved in the session that have not been presented, and the third category 115 is a presented previous result category that includes result items previously retrieved in the session that have been presented. According to another embodiment, the visualization of the distribution of result items may also include a fourth category which is a category that includes result items previously retrieved in the session that have been presented only in summary or snippet form. The fourth category may be included in addition to, or in place of one or more of, the first category 113, the second category 114, and the third category 115.

According to an embodiment, the non-presented previous result category includes result items that have been displayed in a listing of search results but not opened (e.g., by clicking on a link) by the user, and the presented previous results category includes result items that have been displayed in the listing of search results and downloaded and/or opened by the user.

Figure 1C:
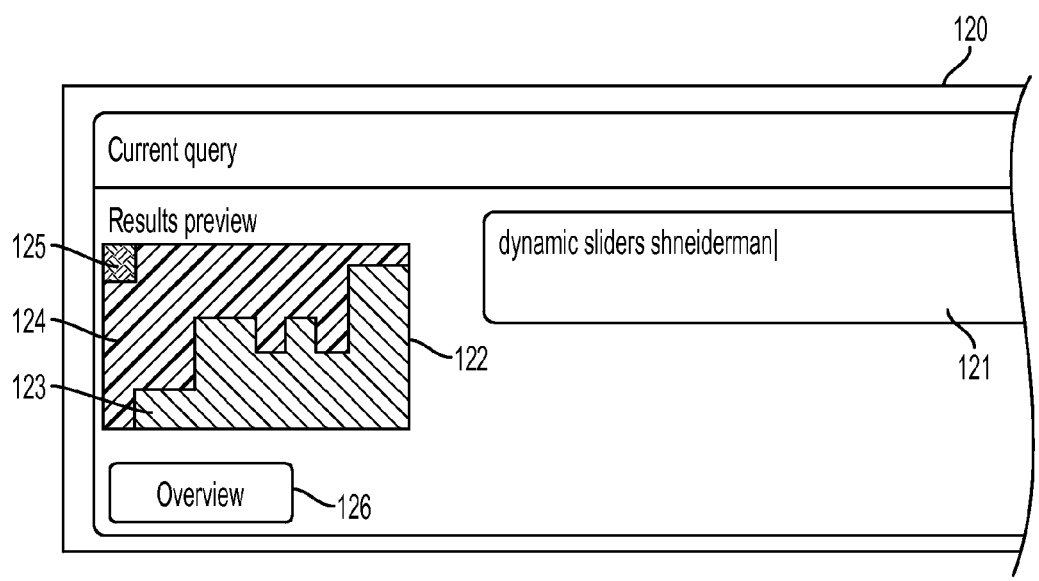

FIG. 1C illustrates a query preview interface 120 according to an embodiment. The query preview interface 120 includes a search box 121, a query results preview 122, and a button 126 that allows for switching between alternate views of the query results preview 112.

The query results preview 122 is a visualization of the distribution of result items among a first category 123, a second category 124, and a third category 125. In the query results preview 122, the distribution of the result items among the first category 123, the second category 124, and the third category 125 is shown per page, for a plurality of pages. The button 126 may be clicked to switch between the distribution per-page visualization and an overall/summary visualization.

The query results preview 122 includes ten stacked bar columns corresponding to ten pages of result items. For each column, the proportion of that column shaded in a first color signifies the proportion of result items on the page of search results corresponding to that column that fall into the first category 123. Likewise, for each column, the proportion of that column shaded in a second color signifies the proportion of result items on the page of search results corresponding to that column that fall into the second category 124; and the proportion of that column shaded in a third color signifies the proportion of result items on the page of search results corresponding to that column that fall into the third category 125.

The query results preview 122 in this example shows that, for a first page of search results represented by the leftmost column, a comparatively large proportion includes result items falling into the second category 124, and a comparatively small proportion includes result items falling into the third category 125. No result items on the first page of search results fall into the first category 123.

Figure 1D:
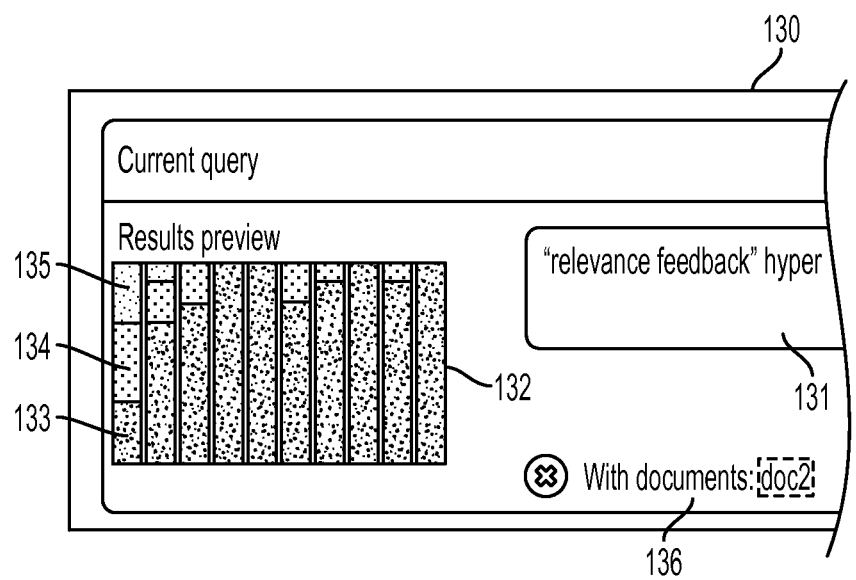

FIG. 1D illustrates a query preview interface 130 according to an embodiment. The query preview interface 130 includes a search box 131, a query results preview 132, and an enumeration of any documents used as search criteria 136 (i.e., as relevance feedback). The query results preview 132 includes ten bar columns corresponding to ten pages of result items. In this embodiment, the stacked bar columns in the query results preview 132 are separated by blank space. The query results preview 132 is a visualization of the distribution of result items among a first category 133, a second category 134, and a third category 135, each represented by distinct colors or patterns.

While the query results previews illustrated in FIGS. 1A, 1B, 1C, and 1D employ bar graphs, other visualizations are possible, including histograms, pie charts, and any other data visualization techniques. Categories may be represented by colors, shapes, or other visual effects. Annotations may be provided that identify or describe the represented categories.

The query results preview may be created using any metrics for analyzing search results. In an embodiment, a metric may be computed from the ranked list of result items and visualized spatially (e.g., using a progress bar), by mapping to color, brightness, saturation, hue, opacity, or any other visual quality, or categorically (e.g., by quantizing the metric value to one of a few fixed levels). These visual features may be combined. In an embodiment, the metric may be rendered in audio by mapping the metric to a tone, pitch, frequency, scale, tune, or some other audio rendering. The metric may also be rendered on a tactile output device. Multiple modalities may be combined.

Any value that represents the quality of the result set may be used as a metric. According to an embodiment, a recall metric is used in which the number of new result items is determined as a fraction of the total number of result items retrieved. In another embodiment, an average precision metric is used. Given a ranked list of result items retrieved by the preliminary query, a value of 1 (relevant) is assigned to each previously unretired result item, and a value of 0 is assigned to all other result items. Average precision is determined by computing the average of the precision scores computed at each rank that contains a relevant result item. In another embodiment, a discounted cumulative gain metric is used, using the same representation described above. Any other metric for computing the effectiveness of a search query may be used.

According to another embodiment, a graded relevance metric may be used. Rather than assigning only 0 or 1 values to represent novelty, intermediate values may be assigned to result items that may have been retrieved but not presented (e.g., viewed), in proportion to the number of times a document was retrieved. According to another embodiment, retrieval scores may be used as a metric. The retrieval scores that underlie the ranked list of result items may be used to compute scores by assigning the retrieval score (rather than 1) to each relevant document, and setting all other result items' scores to 0. Average precision and discounted cumulative gain may then be calculated. In another embodiment, the "knee" in the curve created by the retrieval scores is calculated, and the fraction of the new result items above the knee is used as a metric. According to another embodiment, multiple metrics may be calculated, and a linear combination of metrics may be selected. Alternatively, an adaptive technique such as machine learning may be used in which weights are selected on the linear combination of metrics by learning which metrics best predict user satisfaction with the search results.

Figure 2:
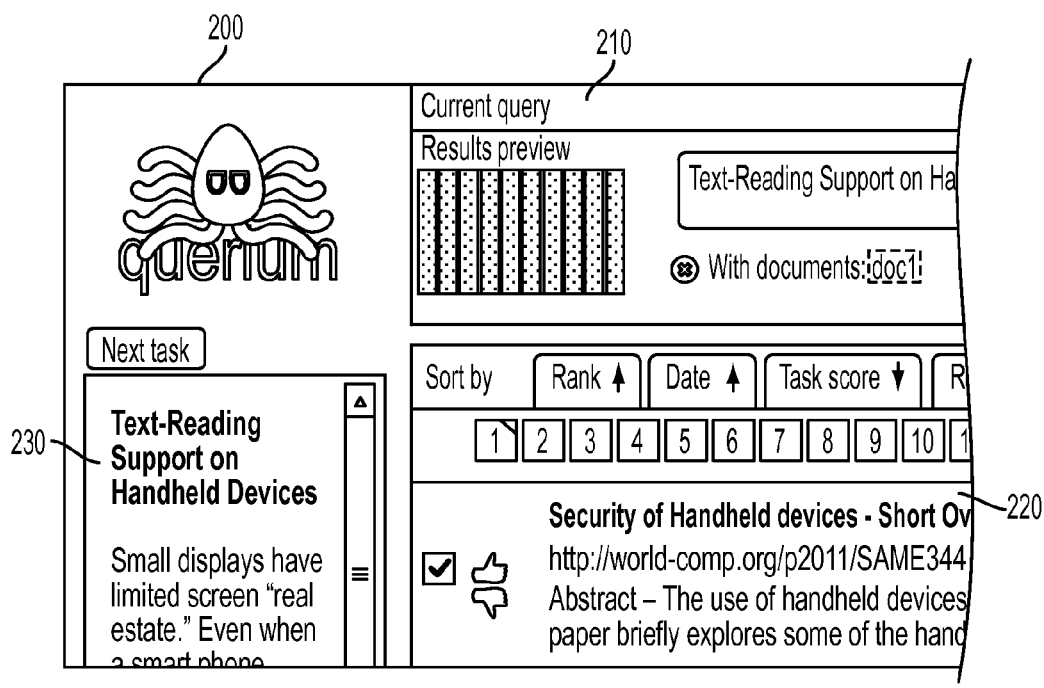
FIG. 2 illustrates a web page including an exploratory search interface including a query preview interface, according to an embodiment.

FIG. 2 illustrates a search interface 200 according to an embodiment that includes a current query portion 210 that provides a text box for entry of a query as well as the query results preview and the enumeration of the documents used as search criteria (i.e., as relevance feedback). The search interface 200 may include a "next task" button allowing a user to specify the start of a new session or a new search mission. Additionally, the search interface 200 may provide for switching between existing sessions.

The search interface 200 also includes a search results portion 220 that provides a listing of result items corresponding to the last executed search. The search results portion 220 may include various controls allowing for sorting of the search results and navigation through the search results, which may be displayed on pages that include a listing of a predetermined number of result items. The listing for each result item in the search results portion 220 may include a name or title of the result item and a uniform resource identifier (URI) such as a uniform resource locator (URL) or a uniform resource name (URN). The listing for each result item in the search results portion 220 may further include a summary or abstract for the result item.

According to an embodiment, the search interface 200 may also include a result item preview portion 230 that provides a preview of a particular result item among the result items listed in the search results portion 220. The result item preview portion 230 may show an image such as a thumbnail image of a selected result item, or it may show a text excerpt from a selected result item.

Figure 3:
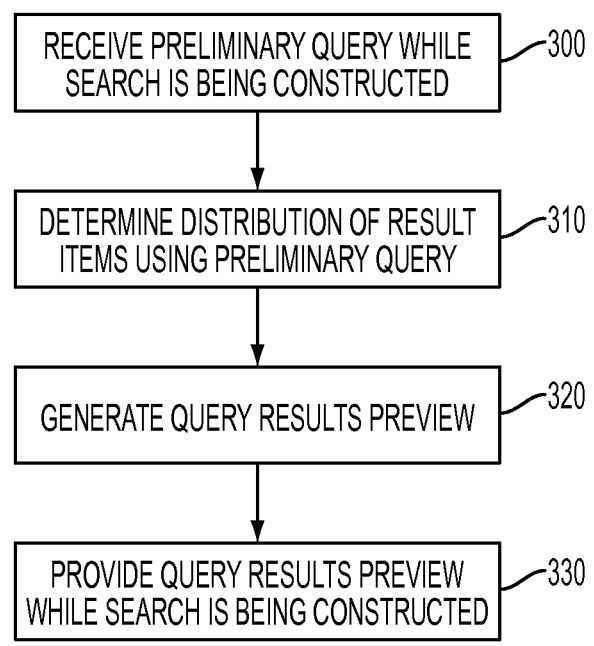
FIG. 3 is a flow diagram illustrating a process for providing a query results preview, according to an embodiment.

FIG. 3 is a flow diagram illustrating a process for providing a query results preview, according to an embodiment. A preliminary query is received while a search query is being constructed in block 300. According to an embodiment, any text entered into the search box prior to the user deciding to execute the search is received as the preliminary query. The preliminary query may be received by a server providing a search service according to an embodiment. Alternatively, the preliminary query may be received by a client machine on which a user is performing a search.

In block 310, a distribution of result items that would be retrieved if the search were executed using the preliminary query, among two or more categories, is determined. According to an embodiment, a distribution of result items is determined with respect to a new result category comprising new result items and a previous result category comprising result items previously retrieved in a session. This determination may be made by the server providing the search service, according to an embodiment. Alternatively, the determination may be made by the client machine on which the user is performing the search. Result items retrieved in searches previously executed in the session are stored, but these result items that would be retrieved if the search were executed using the preliminary query are not stored with the group of previous result items since the search has not actually been executed using the preliminary query. Alternatively, in another embodiment, IDs corresponding to the URLs of the result items may be stored along with flags providing additional information about the result items and/or previous interactions with the result items and later retrieved for comparison with the result items that would be retrieved if a search were executed using the preliminary query.

In block 320, a query results preview is generated using the determined distribution of result items that would be retrieved if the search were executed using the preliminary query. According to an embodiment, the query results preview is a visualization of the distribution of result items that would be retrieved if the search were executed using the preliminary query. The visualization may be in the form of a bar graph or any other visualization that depicts the determined distribution of result items among the two or more categories. According to an embodiment, the bar graph uses a first bar color or pattern to represent the new result category and a second bar color or pattern to represent the previous result category. In another embodiment, the bar graph uses a first bar color or pattern to represent the new result category, a second bar color or pattern to represent the non-presented previous result category, and a third bar color or pattern to represent the presented previous result category. The query results preview may be generated either by the server or by the client machine.

In block 330, the query results preview is provided while the search is being constructed. According to an embodiment, the query results preview is displayed adjacent to a text box into which a query is entered. The query results preview may also be displayed at other locations within the search interface or in a different window or screen. Providing the query results preview while the search is being constructed may include displaying the bar graph while the query is being formulated, or at any point prior to the execution of the search.

According to an embodiment, the query results preview is displayed while a user is typing the search query. The user thus receives real-time feedback with respect to the search query that the user is in the process of constructing, based on the preliminary query that is typed into the search box. As the user continues typing and thus modifies the preliminary query, updated query results previews are displayed. An animation may be provided that transitions between the previously displayed query results preview and the updated query results preview. Once the user is satisfied that the search will provide useful results, aided by the information presented in the query results preview, the user may execute the search. Once the search is executed, result items retrieved by the search are stored as result items retrieved in searches previously executed in the session.

Figure 4:
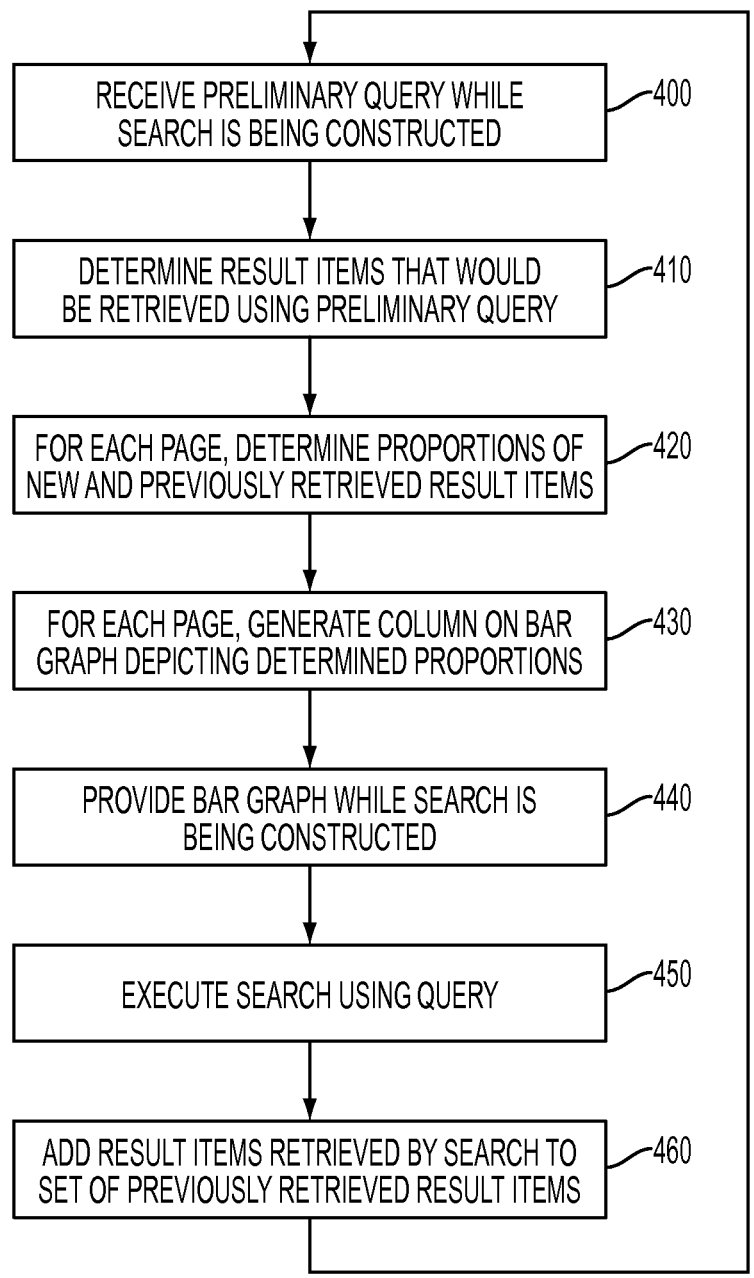
FIG. 4 is a flow diagram illustrating a process for providing a query results preview in the form of a bar graph, according to an embodiment.

FIG. 4 is a flow diagram illustrating a process for providing a query results preview in the form of a bar graph, according to an embodiment. In block 400, a preliminary query is received while a search query is being constructed. In block 410, a determination is made regarding the result items that would be retrieved if the search were executed using the preliminary query. This may be performed by the server providing the search service. Alternatively, a client machine may make this determination. Result items retrieved in searches previously executed in the session are stored, but these result items that would be retrieved if the search were executed using the preliminary query are not stored with the group of previous result items since the search has not actually been executed using the preliminary query.

According to an embodiment, a predetermined number of result items are displayed on a page of search results, and a navigation interface is provided allowing movement between a plurality of pages of search results. In block 420, for each page of result items that would be retrieved if the search were executed using the preliminary query, a distribution of result items among two or more categories is determined. This may be performed by the server providing the search service. Alternatively, a client machine may make this determination.

In an embodiment, for each page of result items, a proportion of result items on that page falling into a new result category that includes new result items is determined, along with a proportion of result items on that page falling into a previous result category that includes result items previously retrieved in the session. Result items that would be retrieved if the search were executed using the preliminary query may be compared against the stored result items retrieved in previously executed searches in order to determine whether a particular result item falls into the new result category or the previous result category.

In block 430, a query results preview is generated that includes a plurality of bar columns representing a plurality of pages of result items. Each bar column is a representation of the distribution of result items listed in the page of result items corresponding to that bar column, among two or more categories. In an embodiment, each bar column may use a first bar color or pattern to represent the new result category and a second bar color or pattern to represent the previous result category. In another embodiment, the bar graph uses a first bar color or pattern to represent the new result category, a second bar color or pattern to represent the non-presented previous result category, and a third bar color or pattern to represent the presented previous result category. The query results preview may be generated either by the server or by the client machine.

In block 440, the bar graph is provided as the query results preview while the search is being constructed. Providing the query results preview while the search is being constructed may include displaying the bar graph while the query is being formulated, or at any point prior to the execution of the search. Once the user is satisfied that the search will provide useful results, aided by the information presented in the query results preview, the user may execute the search in block 450. Once the search is executed, result items retrieved by the search are stored as result items retrieved in searches previously executed in the session in block 460. After executing the search, the user may elect to construct another search query and potentially execute another search, in which case the flow advances to block 400.

Figure 5:
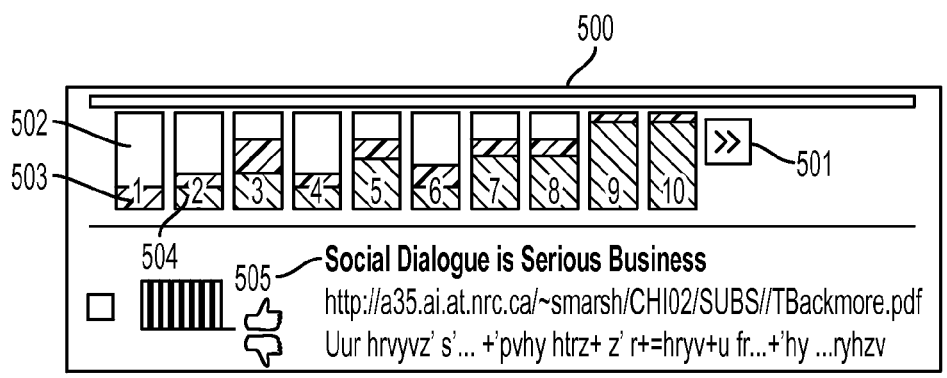
FIG. 5 illustrates a page items preview, according to an embodiment.

FIG. 5 illustrates a page items preview 500 according to another embodiment. In this embodiment, instead of or in addition to providing a preview of result items that would be retrieved if the search were executed using the preliminary query, after a search is performed, a preview may be provided that is a visualization of the result items appearing on each page of a plurality of pages of result items. Bar 504 illustrates the result items that appear on page 2 of the search results. Likewise, in the page items preview 500, bars are also provided that illustrate the result items that appear on the other pages 1 through 10 of the result items retrieved by the search. A navigation button 501 is provided that allows a user to move to the next page of result items.

Bar 504 includes portions in three different colors or patterns 502, 503, 504, representing the relative proportions of result items appearing on page 2 of the result items among three categories that correspond to the three different colors or patterns, such as a new result category, a non-presented previous result category, and a presented previous result category. Result items 505 appearing on the current page may be displayed above or below the bars provided for the plurality of pages.

Figure 6:
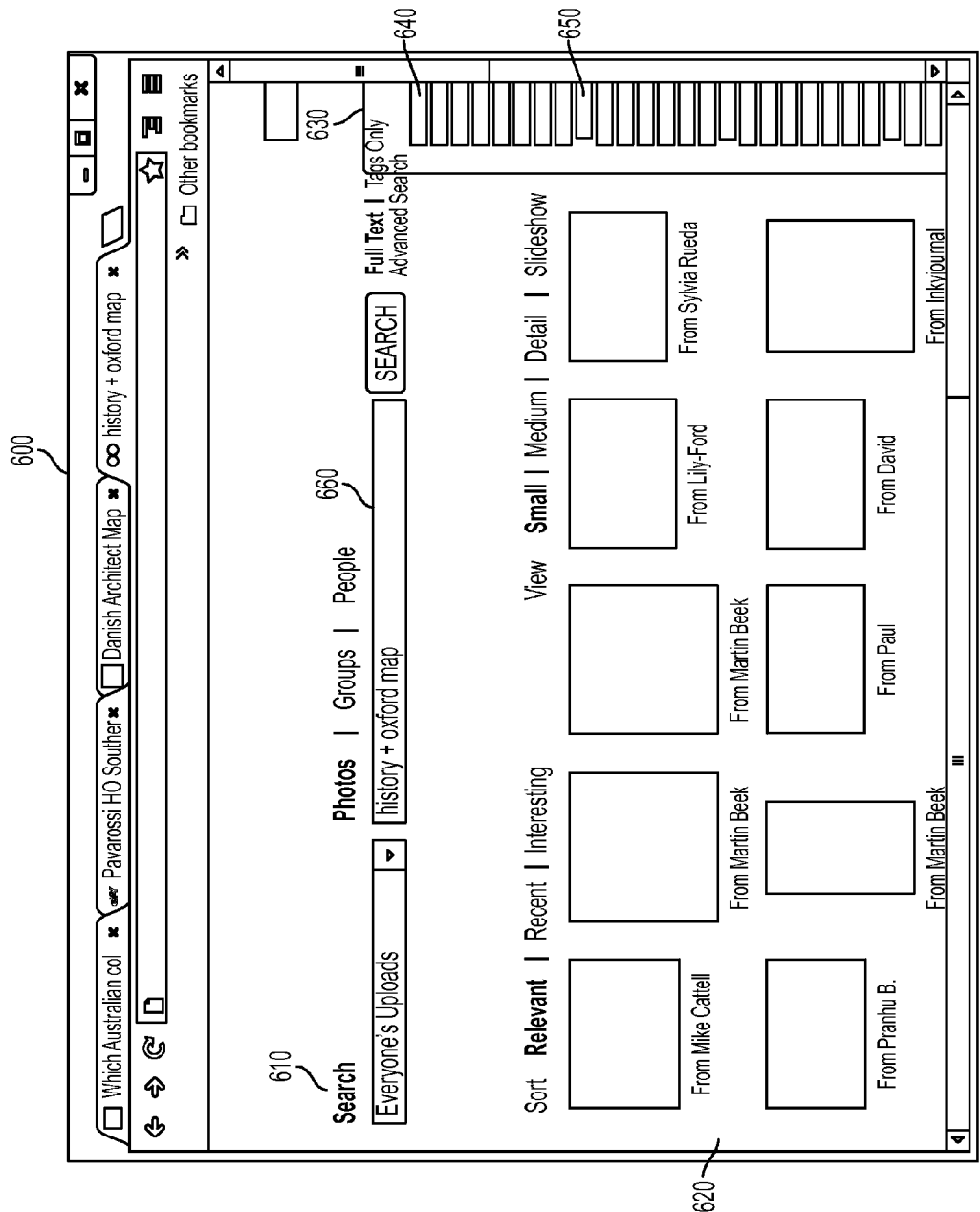
FIG. 6 illustrates a browser plug-in that provides a query results visualization, according to an embodiment.

FIG. 6 illustrates a plug-in for a web browser 600 that provides a query results visualization 630, according to another embodiment. The browser plug-in may provide a query results visualization 630 for a user that is using a search provider or search service 610 that does not generate the query results preview at the server side. A search box 660 is provided for entry of a search query, and result items 620 are displayed within the browser 600 after the search is executed.

The browser-plug in may generate a query results visualization 630 once the search has been executed. The query results visualization 630 provides a graphical representation of the result items retrieved by the search. According to an embodiment, relatively longer bars 640 may be displayed to represent result items that have been previously retrieved relatively fewer times and are thus potentially more interesting or surprising to the user, and relatively shorter bars 650 may be displayed to represent result items that have been previously retrieved relatively more times and are thus potentially less interesting or surprising to the user. Additionally, color coding may be used to represent result items that have been presented to the user (e.g., result items that a user has clicked on or otherwise opened or viewed). More information may be provided such as by way of a tooltip when a cursor is moved over the bars 640 and 650. A user may be able to click the bars 640 and 650 to navigate to a result item corresponding to the clicked bar. A button may be provided in the query results visualization 630 that returns the user to the search results.

Figure 7:
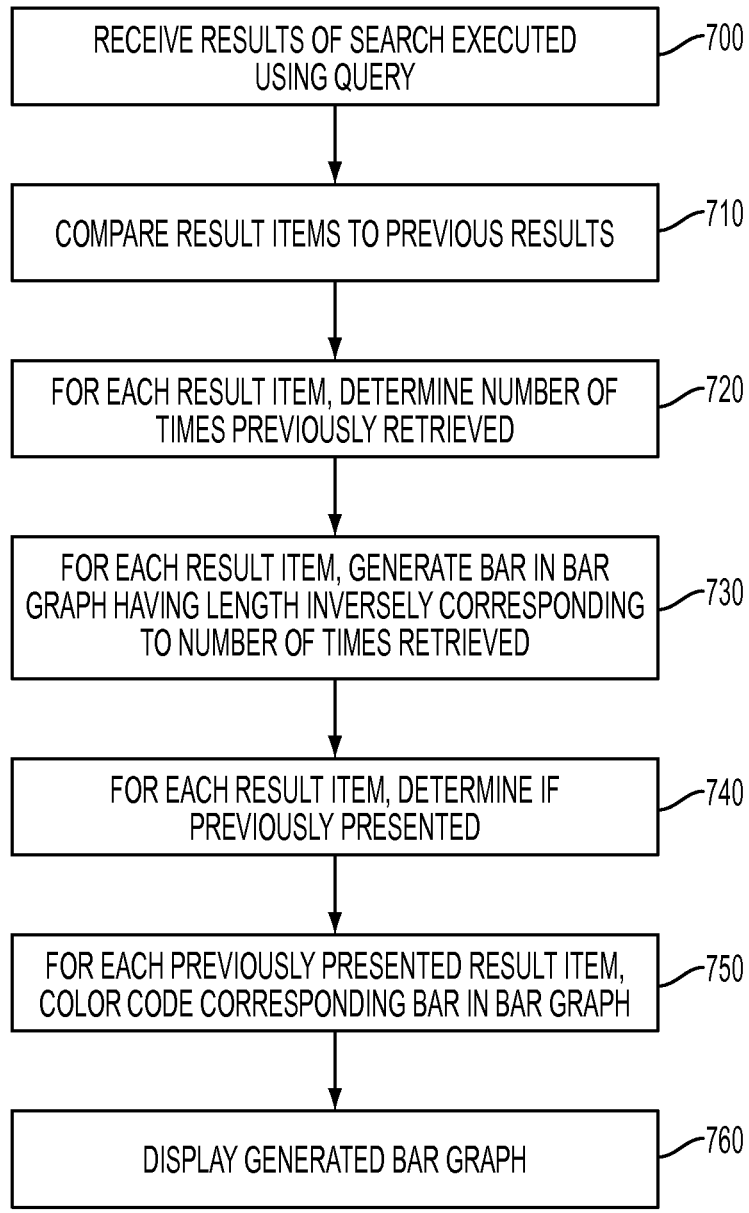
FIG. 7 is a flow diagram illustrating a process of providing a query results visualization, according to an embodiment.

FIG. 7 is a flow diagram illustrating a process of providing a query results visualization, according to an embodiment. The query results visualization may be provided using a web browser plug-in. In block 700, result items retrieved by a search executed using a query are received. In block 710, the received result items are compared with result items retrieved by previous searches executed within a session or search mission. A determination is made regarding the number of times each result item has been previously retrieved in block 720. A graphical representation corresponding to each result item is then generated. According to an embodiment, in block 730, a bar is generated for each result item, the bar having a length inversely corresponding to the number of times that result item has been retrieved. In block 740, a determination is made for each result item regarding whether or not that result item has been previously presented (e.g., clicked on or otherwise opened or viewed by a user). In block 750, bars corresponding to each previously presented result item are coded using a color or pattern representing previously presented result items. In block 760, a bar graph including the plurality of bars generated for the plurality of result items is displayed. The plug-in may overlay the bar graph inside the web browser window, or the bar graph may be displayed in a separate window or display. The plug-in may store information on the client machine regarding result items retrieved in searches within a session, as well as information on result items that are opened or viewed.

Figure 8:
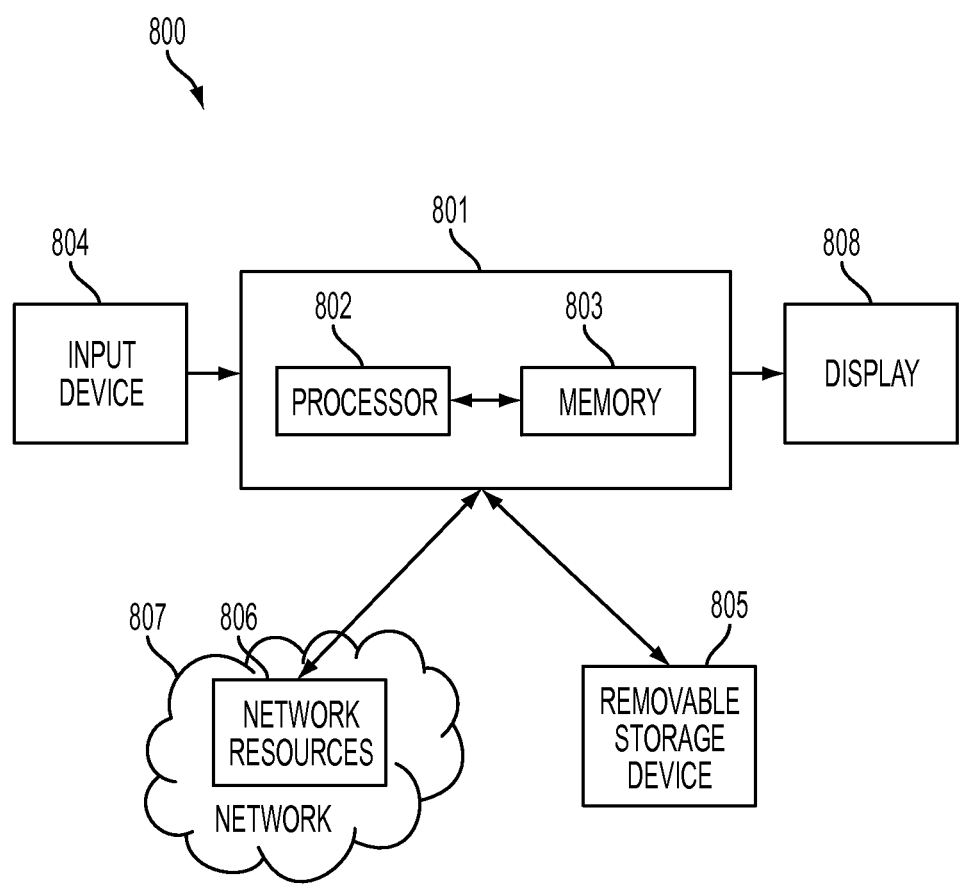
FIG. 8 is a block diagram illustrating a computer system upon which the system may be implemented, according to an embodiment.

FIG. 8 is a block diagram that illustrates an embodiment of a computer/server system 800 upon which an embodiment may be implemented. The system 800 includes a computer/server platform 801 including a processor 802 and memory 803 which operate to execute instructions, as known to one of skill in the art. The term "computer-readable storage medium" as used herein refers to any tangible medium, such as a disk or semiconductor memory, that participates in providing instructions to processor 802 for execution. Additionally, the computer platform 801 receives input from a plurality of input devices 804, such as a keyboard, mouse, touch device, touchscreen, or microphone. The computer platform 801 may additionally be connected to a removable storage device 805, such as a portable hard drive, optical media (CD or DVD), disk media or any other tangible medium from which a computer can read executable code. The computer platform may further be connected to network resources 806 which connect to the Internet or other components of a local public or private network. The network resources 806 may provide instructions and data to the computer platform from a remote location on a network 807. The connections to the network resources 806 may be via wireless protocols, such as the 802.11 standards, Bluetooth® or cellular protocols, or via physical transmission media, such as cables or fiber optics. The network resources may include storage devices for storing data and executable instructions at a location separate from the computer platform 801. The computer interacts with a display 808 to output data and other information to a user, as well as to request additional instructions and input from the user. The display 808 may be a touchscreen display and may act as an input device 804 for interacting with a user.

Figure 9:
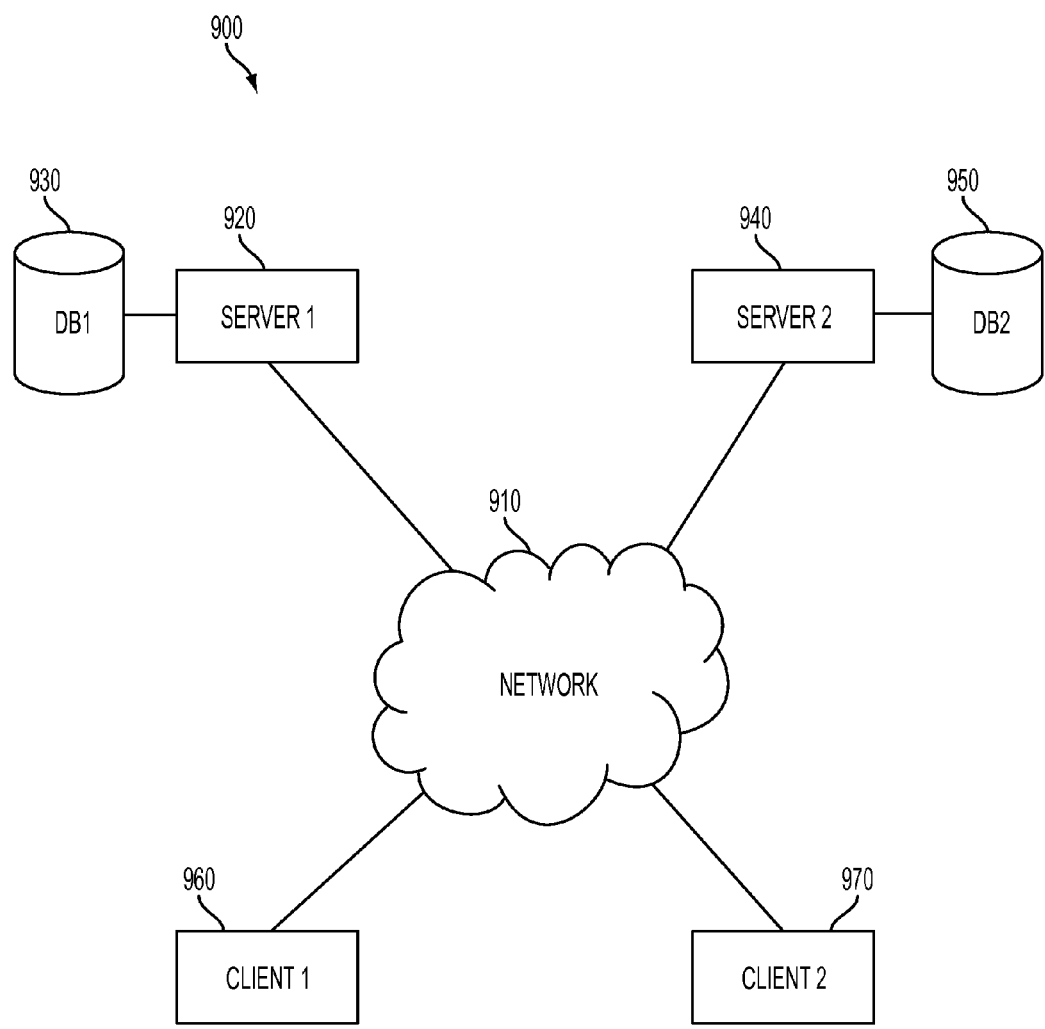
FIG. 9 is a block diagram illustrating a network including servers upon which the system may be implemented and client machines that communicate with the servers, according to an embodiment.

FIG. 9 is a block diagram that illustrates an embodiment of a network 900 including servers 920, 940 upon which the system may be implemented and client machines 960, 970 that communicate with the servers 920, 940. The client machines 920, 940 communicate across the Internet or another wide area network (WAN) or local area network (LAN) 910 with server 1 920 and server 2 940. Server 1 920 communicates with database 1 930, and server 2 940 communicates with database 2 950. According to an embodiment, server 1 920 and server 2 940 may implement exploratory search systems including a query result preview interface. Client 1 960 and client 2 970 may request the execution of search queries on the exploratory search systems implemented on server 1 920 and server 2 940. Server 1 920 may communicate with database 1 930 in the process of executing a search query at the request of a client, and server 2 940 may communicate with database 2 950 in the process of executing a search query at the request of a client.

Figure 10:
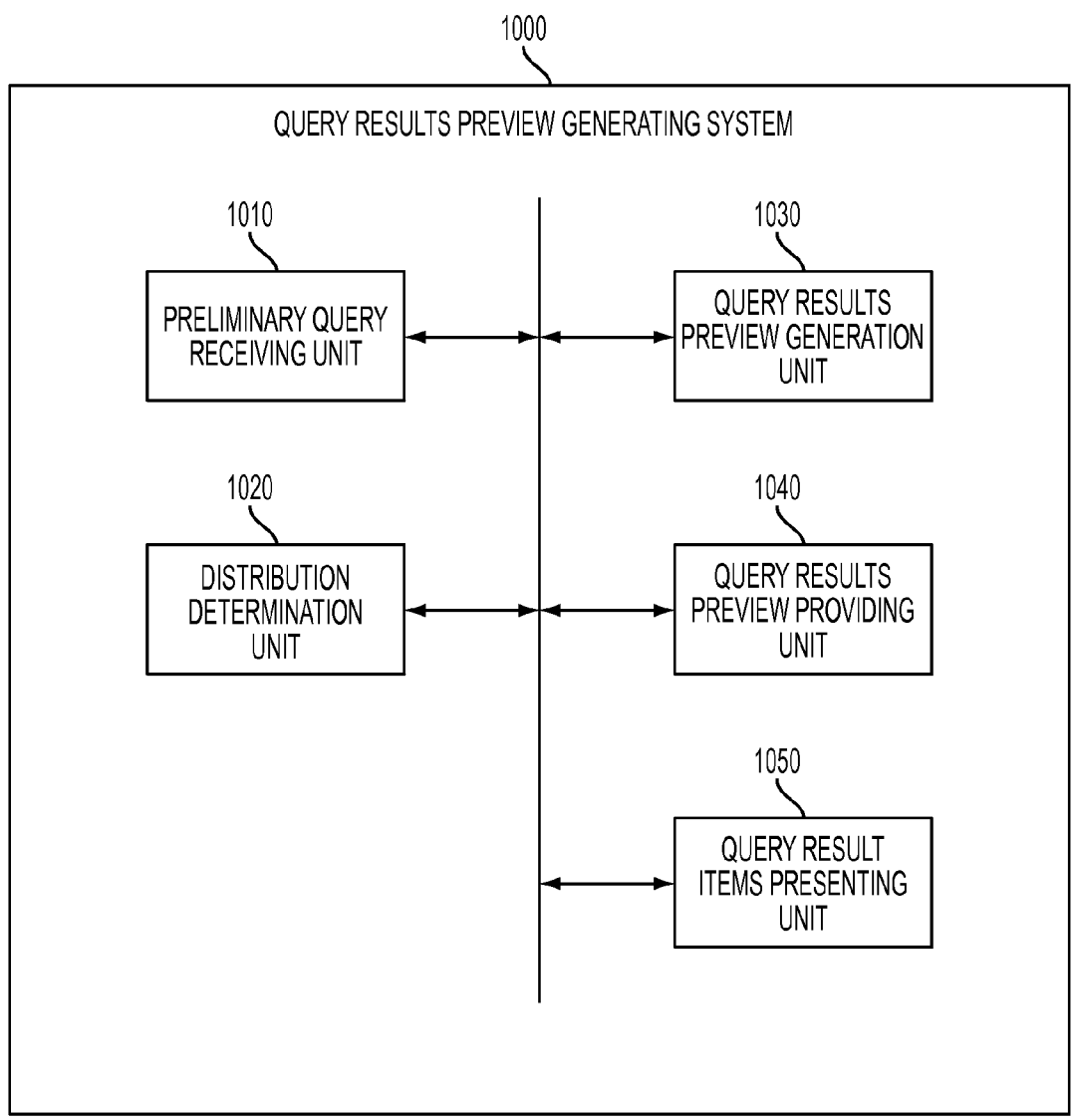
FIG. 10 is a block diagram illustrating a query results preview generating system, according to an embodiment.

FIG. 10 is a block diagram that illustrates an embodiment of a query results preview generating system 1000 which includes a preliminary query receiving unit 1010, a distribution determination unit 1020, a query results preview generation unit 1030, a query results preview providing unit 1040, and a query result items presenting unit 1050.

The preliminary query receiving unit 1010 receives a preliminary query while a query for a search is being constructed. The distribution determination unit 1020 determines a distribution of result items that would be retrieved if the search were executed using the preliminary query, among two or more categories. The query results preview generation unit 1030 generates the query results preview using the distribution of result items that would be retrieved if the search were executed using the preliminary query. The query results preview providing unit 1040 provides the query results preview while the query for the search is being constructed and prior to execution of the search using the query.

The query result items presenting unit 1050 presents result items in pages comprising a predetermined number of the result items. Each column in the bar graph generated by the query results preview generation unit 1030 represents the distribution of result items in a page of the result items that would be retrieved if the search were executed using the preliminary query. According to another embodiment, the query results preview generating system 1000 may omit the query result items presenting unit 1050.

Figure 11:
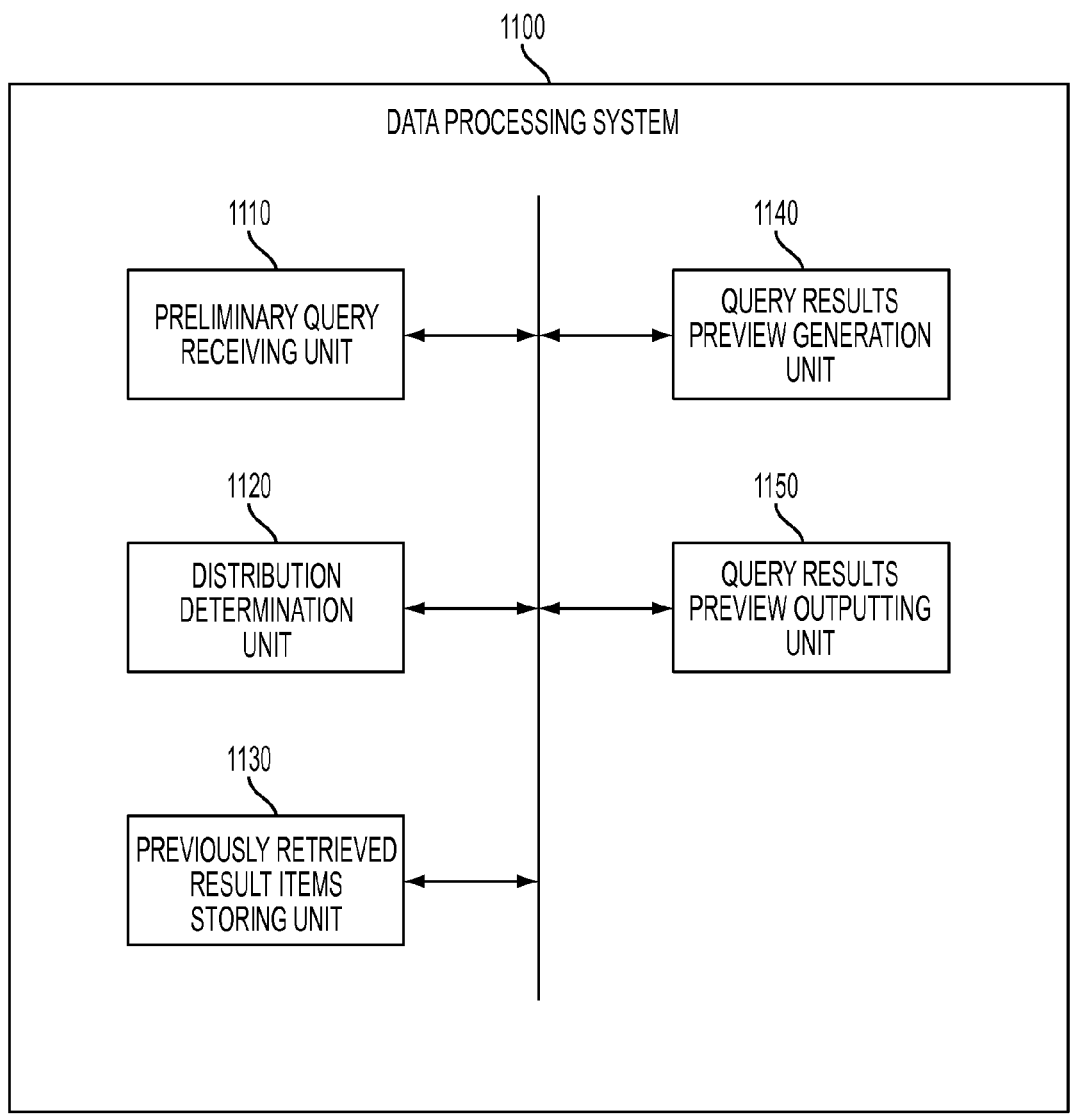
FIG. 11 is a block diagram illustrating a data processing system that generates a query results preview, according to an embodiment.

FIG. 11 is a block diagram that illustrates an embodiment of a data processing system 1100 that generates a query results preview. The data processing system 1100 includes a preliminary query receiving unit 1110, a distribution determination unit 1120, a previously retrieved result items storing unit 1130, a query results preview generation unit 1140, and a query results preview outputting unit 1150.

The preliminary query receiving unit 1110 receives a preliminary query while a query for a search is being constructed. The distribution determination unit 1120 determines a relationship of result items that would be retrieved if the search were executed using the preliminary query with respect to at least a first category and a second category. The previously retrieved result items storing unit 1130 stores information about result items retrieved by previous searches in the session. The query results preview generation unit 1140 generates the query results preview that provides a representation of the relationship of the result items that would be retrieved if the search were executed using the preliminary query with respect to at least the first category and the second category. The query results preview outputting unit 1150 outputs the query results preview while the query for the search is being constructed and prior to execution of the search using the query.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A method for generating a query results preview, the method comprising:
   receiving a preliminary query while a query for a search is being constructed;
   determining, using a processor, a distribution of result items that would be retrieved if the search were executed using the preliminary query, including a first proportion of the result items in a new result category comprising new result items that have not been previously retrieved in response to a previous search by a user in a session and a second proportion of the result items in a previous result category comprising result items previously retrieved in response to a previous search in the session;
   generating the query results preview using the distribution of result items that would be retrieved if the search were executed using the preliminary query; and
   providing the query results preview while the query for the search is being constructed and prior to execution of the search using the query,
   wherein the query results preview comprises a visualization of the distribution of result items that would be retrieved if the search were executed using the preliminary query, including the first proportion of the result items in the new result category and the second proportion of the result items in the previous result category, the first proportion and the second proportion being separately displayed in the query results preview.

2. The method of claim 1, wherein the previous result category is divided into a non-presented previous result category comprising result items previously retrieved in the session that have not been presented and a presented previous result category comprising result items previously retrieved in the session that have been presented.

3. The method of claim 1, wherein the visualization comprises a bar graph.

4. The method of claim 3, wherein the bar graph uses a first bar color to represent the new result category and a second bar color to represent the previous result category.

5. The method of claim 2, wherein:
   the visualization comprises a bar graph, and
   the bar graph uses a first bar color to represent the new result category, a second bar color to represent the non-presented previous result category, and a third bar color to represent the presented previous result category.

6. The method of claim 3, wherein result items are presented in pages comprising a predetermined number of the result items, and
   each column in the bar graph represents the distribution of result items in a page of the result items that would be retrieved if the search were executed using the preliminary query.

7. The method of claim 1, wherein the providing the query results preview while the query for the search is being constructed and prior to execution of the search using the query comprises providing the query results preview while the query is being typed.

8. The method of claim 1, wherein the result items that would be retrieved if the search were executed using the preliminary query are not added to a set of result items previously retrieved in the session;
   after the preliminary query is accepted as the query and the search is executed using the query, result items retrieved by the search are added to the set of result items previously retrieved in the session; and
   when a next preliminary query is received, a result item that would be retrieved if the search were executed using the next preliminary query is determined to be in the previous result category if the result item is in the set of result items previously retrieved in the session.

9. A data processing method for generating a query results preview in a data processing system, the method comprising:
   receiving a preliminary query while a query for a search is being constructed;
   using a processor to determine a frequency of previous retrieval of result items that would be retrieved if the search were executed using the preliminary query, including determining at least a first proportion of the result items in a first category and determining a second proportion of the result items in a second category, the first proportion and the second proportion being determined using a number of times each of the result items has been retrieved in response to previous searches by a user in a session;
   storing information in a memory regarding the frequency of previous retrieval of the result items that would be retrieved if the search were executed using the preliminary query with respect to at least the first proportion of the result items in the first category and the second proportion of the result items in the second category;
   generating the query results preview that provides a representation of the frequency of previous retrieval of the result items that would be retrieved if the search were executed using the preliminary query; and
   outputting the query results preview while the query for the search is being constructed and prior to execution of the search using the query,
   wherein the query results preview comprises a visualization of the frequency of previous retrieval of the result items that would be retrieved if the search were executed using the preliminary query, including the first proportion of the result items in the first category and the second proportion of the result items in the second category, the first proportion and the second proportion being separately displayed in the query results preview.

10. A non-transitory computer readable medium storing a program causing a computer to execute a method for generating a query results preview, the method comprising:
  receiving a preliminary query while a query for a search is being constructed;
  determining, using a processor, a distribution of result items that would be retrieved if the search were executed using the preliminary query, including a first proportion of the result items in a new result category comprising new result items that have not been previously retrieved in response to a previous search by a user in a session and a second proportion of the result items in a previous result category comprising result items previously retrieved in response to a previous search in the session;
  generating the query results preview using the distribution of result items that would be retrieved if the search were executed using the preliminary query; and
  providing the query results preview while the query for the search is being constructed and prior to execution of the search using the query,
  wherein the query results preview comprises a visualization of the distribution of result items that would be retrieved if the search were executed using the preliminary query, including the first proportion of the result items in the new result category and the second proportion of the result items in the previous result category, the first proportion and the second proportion being separately displayed in the query results preview.

11. The non-transitory computer readable medium according to claim 10, wherein the previous result category is divided into a non-presented previous result category comprising result items previously retrieved in the session that have not been presented and a presented previous result category comprising result items previously retrieved in the session that have been presented.

12. The non-transitory computer readable medium according to claim 10, wherein the visualization comprises a bar graph.

13. The non-transitory computer readable medium according to claim 12, wherein the bar graph uses a first bar color to represent the new result category and a second bar color to represent the previous result category.

14. The non-transitory computer readable medium according to claim 11, wherein:
  the visualization comprises a bar graph, and
  the bar graph uses a first bar color to represent the new result category, a second bar color to represent the non-presented previous result category, and a third bar color to represent the presented previous result category.

15. The non-transitory computer readable medium according to claim 10, wherein the result items that would be retrieved if the search were executed using the preliminary query are not added to a set of result items previously retrieved in the session;
  after the preliminary query is accepted as the query and the search is executed using the query, result items retrieved by the search are added to the set of result items previously retrieved in the session; and
  when a next preliminary query is received, a result item that would be retrieved if the search were executed using the next preliminary query is determined to be in the previous result category if the result item is in the set of result items previously retrieved in the session.

16. A system for generating a query results preview, the system comprising:
  a hardware processor executing units comprising:
    a preliminary query receiving unit that receives a preliminary query while a query for a search is being constructed;
    a distribution determination unit that determines a distribution of result items that would be retrieved if the search were executed using the preliminary query, including a first proportion of the result items in a new result category comprising new result items that have not been previously retrieved in response to a previous search by a user in a session and a second proportion of the result items in a previous result category comprising result items previously retrieved in response to a previous search in the session;
    a query results preview generation unit that generates the query results preview using the distribution of result items that would be retrieved if the search were executed using the preliminary query; and
    a query results preview providing unit that provides the query results preview while the query for the search is being constructed and prior to execution of the search using the query,
  wherein the query results preview generated by the query results preview generation unit comprises a visualization of the distribution of result items that would be retrieved if the search were executed using the preliminary query, including the first proportion of the result items in the new result category and the second proportion of the result items in the previous result category, the first proportion and the second proportion being separately displayed in the query results preview.

17. The system of claim 16, wherein the previous result category is divided into a non-presented previous result category comprising result items previously retrieved in the session that have not been presented and a presented previous result category comprising result items previously retrieved in the session that have been presented.

18. The system of claim 16, wherein the visualization generated by the query results preview generation unit comprises a bar graph.

19. The system of claim 18, wherein the bar graph generated by the query results preview generation unit uses a first bar color to represent the new result category and a second bar color to represent the previous result category.

20. The system of claim 17, wherein:
  the visualization generated by the query results preview generation unit comprises a bar graph, and
  the bar graph generated by the query results preview generation unit uses a first bar color to represent the new result category, a second bar color to represent the non-presented previous result category, and a third bar color to represent the presented previous result category.

21. The system of claim 16, wherein the distribution determination unit does not add the result items that would be retrieved if the search were executed using the preliminary query to a set of result items previously retrieved in the session;
  after the preliminary query is accepted as the query and the search is executed using the query, a previously retrieved result items storing unit adds result items retrieved by the search to the set of result items previously retrieved in the session; and
  when a next preliminary query is received, the distribution determination unit determines a result item that would be retrieved if the search were executed using the next preliminary query is in the previous result category if the result item is in the set of result items previously retrieved in the session.

22. A non-transitory computer readable medium storing a program causing a computer to execute a method for generating a query results preview, the method comprising:
   receiving a preliminary query while a query for a search is being constructed;
   using a processor to determine a frequency of previous retrieval of result items that would be retrieved if the search were executed using the preliminary query, including determining at least a first proportion of result items in a first category and a second proportion of the result items in a second category, the first proportion and the second proportion being determined using a number of times each of the result items has been retrieved in response to previous searches by a user in a session;
   storing information in a memory regarding the frequency of previous retrieval of the result items that would be retrieved if the search were executed using the preliminary query including the first proportion of the result items in the first category and the second proportion of the result items in the second category;
   generating the query results preview that provides a representation of the frequency of previous retrieval of the result items that would be retrieved if the search were executed using the preliminary query; and
   outputting the query results preview while the query for the search is being constructed and prior to execution of the search using the query,
   wherein the query preview comprises a visualization of the frequency of previous retrieval of the result items that would be retrieved if the search were executed using the preliminary query, including the first proportion of the result items in the first category and the second proportion of the result items in the second category, the first proportion and the second proportion being separately displayed in the query results preview.

* * * * *